(12) United States Patent
Yeom et al.

(10) Patent No.: US 9,937,814 B2
(45) Date of Patent: Apr. 10, 2018

(54) BATTERY PACK, METHOD OF CONTROLLING THE SAME, AND DRIVING SYSTEM OF ELECTRO-MECHANICAL APPARATUS INCLUDING THE SAME

(71) Applicant: SAMSUNG SDI CO., LTD., Yongin-si, Gyeonggi-do (KR)

(72) Inventors: Gil Choun Yeom, Yongin-si (KR); Young Dong Seo, Yongin-si (KR)

(73) Assignee: Samsung SDI Co., Ltd., Yongin-si, Gyeonggi-do (KR)

( * ) Notice: Subject to any disclaimer, the term of this patent is extended or adjusted under 35 U.S.C. 154(b) by 168 days.

(21) Appl. No.: 14/840,133

(22) Filed: Aug. 31, 2015

(65) Prior Publication Data
US 2016/0214501 A1    Jul. 28, 2016

(30) Foreign Application Priority Data

Jan. 27, 2015  (KR) .................... 10-2015-0013047

(51) Int. Cl.
| | | |
|---|---|---|
| H02J 7/00 | (2006.01) |
| B60L 11/18 | (2006.01) |
| H02J 7/14 | (2006.01) |
| H01M 10/44 | (2006.01) |
| H01M 10/48 | (2006.01) |

(52) U.S. Cl.
CPC ....... *B60L 11/1864* (2013.01); *B60L 11/1851* (2013.01); *B60L 11/1872* (2013.01); *H01M 10/441* (2013.01); *H01M 10/48* (2013.01); *H02J 7/0026* (2013.01); *H02J 7/1446* (2013.01); *H02J 7/1461* (2013.01); *B60L 2240/54* (2013.01); *B60L 2240/545* (2013.01); *H01M 2220/30* (2013.01); *H02J 2007/004* (2013.01); *H02J 2007/0037* (2013.01); *Y02T 10/7005* (2013.01); *Y02T 10/7061* (2013.01); *Y02T 10/92* (2013.01)

(58) Field of Classification Search
USPC ........................................................ 320/109
See application file for complete search history.

(56) References Cited

U.S. PATENT DOCUMENTS

| | | | | |
|---|---|---|---|---|
| 2003/0193318 A1* | 10/2003 | Ozawa | ................. | H02J 7/0047 320/132 |
| 2011/0187329 A1* | 8/2011 | Majima | ................. | G01R 31/36 320/149 |

(Continued)

FOREIGN PATENT DOCUMENTS

| | | |
|---|---|---|
| KR | 10-2001-0005258 A | 1/2001 |
| KR | 10-0940743 B1 | 2/2010 |

*Primary Examiner* — Mohammed Alam
(74) *Attorney, Agent, or Firm* — Lee & Morse, P.C.

(57) ABSTRACT

A battery pack includes a plurality of rechargeable batteries, a sensor, and a battery manager. The sensor obtains motion information of the rechargeable batteries. The motion information includes at least one of first information obtained by sensing whether the rechargeable batteries are in a movement state or in a standstill state or second information on a state in which the rechargeable batteries are inclined. The second information may be obtained based on a change in angle when the rechargeable batteries are in the movement state. The battery manager control charging or discharging of the rechargeable batteries in a charge mode or a discharge mode based on the motion information.

9 Claims, 4 Drawing Sheets

(56) References Cited

U.S. PATENT DOCUMENTS

2012/0001591 A1* 1/2012 Fukaya .................. H02J 7/025
  320/108
2012/0306445 A1* 12/2012 Park .......................... B60S 5/06
  320/109

* cited by examiner

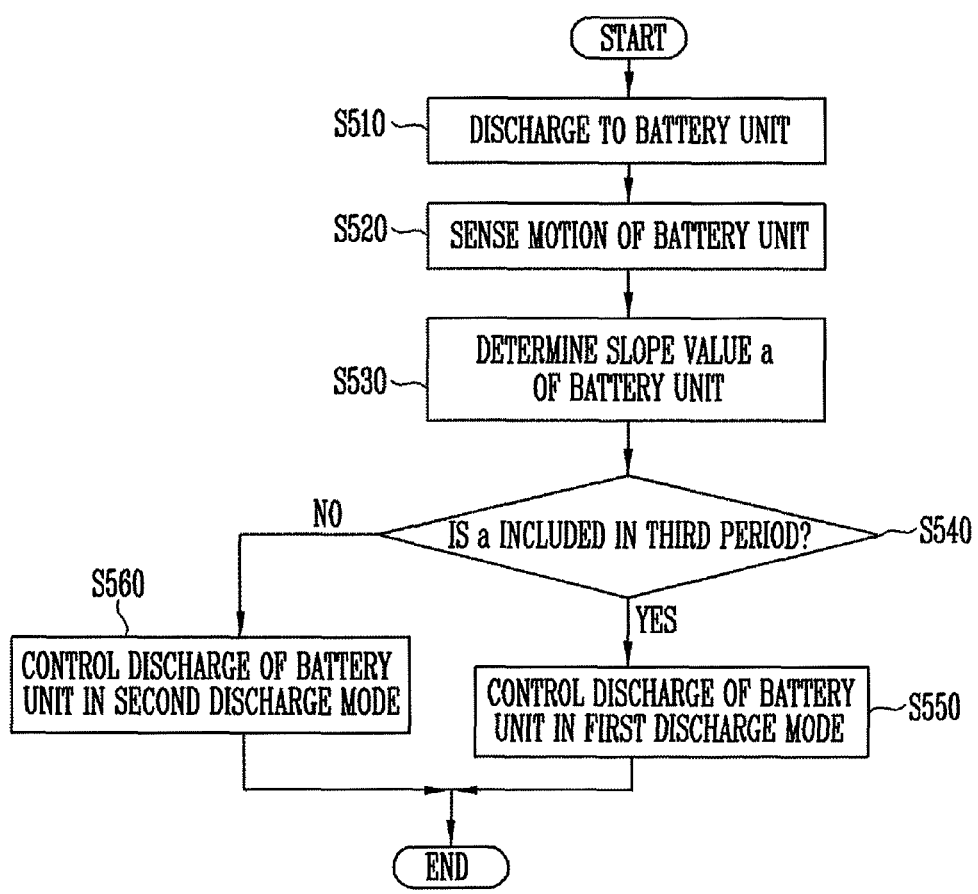

BATTERY PACK, METHOD OF CONTROLLING THE SAME, AND DRIVING SYSTEM OF ELECTRO-MECHANICAL APPARATUS INCLUDING THE SAME

CROSS-REFERENCE TO RELATED APPLICATION

Korean Patent Application No. 10-2015-0013047, filed on Jan. 27, 2015, and entitled, "Battery Pack, Method of Controlling the Same, and Driving System of Electro-Mechanical Apparatus Including the Same," is incorporated by reference herein in its entirety.

BACKGROUND

1. Field

One or more embodiments described herein relate to a battery pack, a method of controlling a battery pack, and a driving system of an electro-mechanical apparatus including a battery pack.

2. Description of the Related Art

The demand for improved secondary (e.g., rechargeable) batteries continues to rise in order to meet the requirements of next-generate electric and hybrid vehicles, and also various types of mobile devices including but not limited to portable computers, mobile telephones, and cameras.

When used in hybrid vehicle, electric vehicle, electric bicycle, golf car, or other electro-mechanical apparatus, the motor of the vehicle or apparatus may not only be used as a rotational driving source powered by the secondary battery, but also as a power source that regenerates energy based on movement of the engine and wheels.

Charging and discharging of the secondary battery may be controlled to protect against over-charged or over-discharged conditions. However, when the same method is used for charging, the stability of a battery pack including the secondary battery may deteriorate and/or use of the regenerated energy may be inefficient.

SUMMARY

In accordance with one or more embodiments, a battery pack including a plurality of rechargeable batteries; a sensor to obtain motion information of the rechargeable batteries, the motion information including at least one of i) first information obtained by sensing whether the rechargeable batteries are in a movement state or in a standstill state or ii) second information on a state in which the rechargeable batteries are inclined, the second information to be obtained based on a change in angle when the rechargeable batteries are in the movement state; and a battery manager to receive the motion information of the rechargeable batteries from the sensor and to control charging or discharging of the rechargeable batteries in a charge mode or a discharge mode based on the motion information.

The battery manager may control charging or discharging of the rechargeable batteries based on protection level data for protecting the rechargeable batteries, the battery manager may apply different protection level data in the charge mode and the discharge mode based on the motion information. The protection level data may include data indicative of at least one of an over-charge reference current, an over-charge reference voltage, an over-discharge reference current, or an over-discharge reference voltage.

When the rechargeable batteries are in the movement state and when charge current is received by the rechargeable batteries, the battery manager may control charging of the rechargeable the batteries in a first charge mode. When the rechargeable batteries are in a standstill state and when charge current is received by the rechargeable batteries, the battery manager may control charging of rechargeable batteries in a second charge mode.

The protection level data in the first charge mode and the second charge mode may include data corresponding to at least one of the over-charge reference voltage or the over-charge reference current, and the over-charge reference voltage or current value in the first charge mode may be larger than the over-charge reference voltage or current value in the second charge mode.

Charge current may be received by the rechargeable batteries when the rechargeable batteries are in a movement state, and when a slope value of the rechargeable batteries is in a first period, the battery manager may control charging of the rechargeable batteries in a third charge mode. When the rechargeable batteries are in a movement state and when the rechargeable batteries are discharged, the battery manager may control discharging of the rechargeable batteries based on protection level data that is differently set based on a period in which a slope value of the rechargeable batteries is included. The protection level data may include data corresponding to at least one of an over-discharge reference current or an over-discharge reference voltage.

In accordance with one or more other embodiments, a driving system of an electro-mechanical apparatus includes a motor to drive an electro-mechanical apparatus; a battery pack to supply driving power to the motor, the battery pack including: a sensor to obtain motion information of a plurality of batteries and the electro-mechanical apparatus and a battery manager to control charging and discharging of the batteries; and an inverter, connected between the motor and the battery pack, to convert current generated by the motor to regenerated energy to be provided to the battery pack, wherein the battery manager is to control charging or discharging of the batteries in a charge mode or a discharge mode corresponding to motion information of the electro-mechanical apparatus.

When the electro-mechanical apparatus is in a movement state and when charge current is received by the battery pack, the battery manager may determine that the battery pack is charged by regenerated energy generated by the motor and is to control charging of the batteries with reference to over-charge preventing protection level data set to correspond to charging by the regenerated energy.

When the electro-mechanical apparatus is in a standstill state and when the charge current is received by the battery pack, the battery manager may determine that the battery pack is being charged based on external power and is to control charging the batteries with reference to over-charge preventing protection level data set to correspond to charge by the external power.

The over-charge preventing protection level data may be set to correspond to charging by the regenerated energy and the over-charge preventing protection level data may be set to correspond charging by the external power includes data on at least one of the over-charge reference voltage or the over-charge reference current, and a value of the over-charge preventing protection level data set to correspond to charging by the regenerated energy may be larger than the over-charge preventing protection level data set to correspond to charging by the external power source.

In accordance with one or more other embodiments, an apparatus an interface; and control logic to receive motion information for a plurality of batteries through the interface and to control charging or discharging of the batteries based on the motion the information, the motion information including at least one of i) first information corresponding to whether the batteries are in a movement state or in a standstill state, or ii) second information indicative of an inclined state of the batteries.

The control logic may control charging of the batteries based on first protection level data and is to control discharging of the batteries based on second protection level data, the first protection level data different from the second protection level data. Each of the first and second protection level data may include data indicative of at least one of an over-charge reference current, an over-charge reference voltage, an over-discharge reference current, or an over-discharge reference voltage. Charge current may be received by the batteries when the batteries are in the movement state.

The control logic may control charging of the batteries when a slope value of the batteries is in a predetermined range. The control logic may be controlled based on instructions stored in a storage area. The interface may include first code to input the motion information to second code of the control logic.

BRIEF DESCRIPTION OF THE DRAWINGS

Features will become apparent to those of skill in the art by describing in detail exemplary embodiments with reference to the attached drawings in which:

FIG. 5 illustrates an embodiment of a method for controlling a discharging operation of a battery pack.

DETAILED DESCRIPTION

Figure 1:
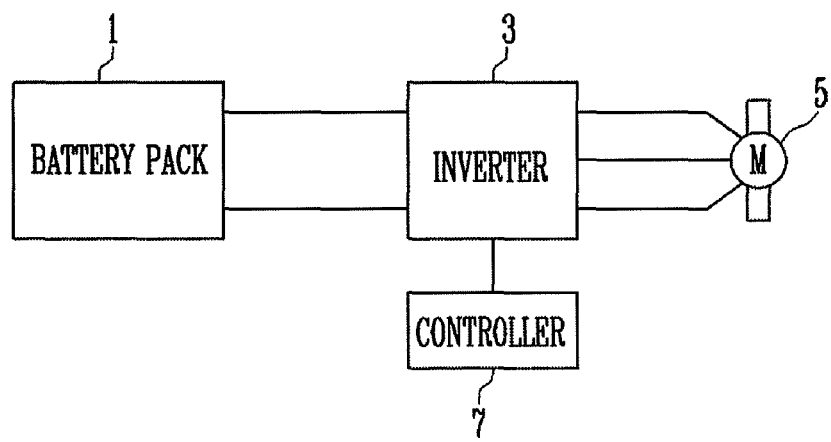
FIG. 1 illustrates an embodiment of a driving system for an electro-mechanical apparatus including a battery pack.

Example embodiments are described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art. The embodiments may be combined to form additional embodiments. Like reference numerals refer to like elements throughout.

FIG. 1 illustrates an embodiment of a driving system for an electro-mechanical apparatus including a battery pack. The electro-mechanical apparatus may be, for example, an electric bicycle, an electric vehicle, a golf car, or another type of electro-mechanical vehicle or apparatus. The apparatus may be, for example, any apparatus or vehicle in which a motor is driven by a power source stored in a battery pack and a driving force of the motor is transmitted to wheels, so that traveling may be performed and energy may be regenerated by the electro-mechanical apparatus or vehicle.

As illustrated in FIG. 1, the driving system includes a battery pack 1, an inverter 3, a motor 5, and a controller 7. The battery pack 1 serves as a power source for driving the motor 5 and is charged based on electrical energy from an external power source and/or regenerated energy from the motor 5.

The inverter 3 may convert a voltage output from the battery pack 1 to a voltage suitable for a driving voltage of the motor 5. The motor 5 receives an alternating current (AC) voltage from the inverter 3 to support an output torque of an engine, and operates as a generator when surplus torque exists in an output of an engine or during braking so that energy may be regenerated. The controller 7 outputs a control signal for operating the inverter 3 and monitors the inverter 3 and/or the motor 5 to control the inverter 3 or the motor 5.

Figure 2:
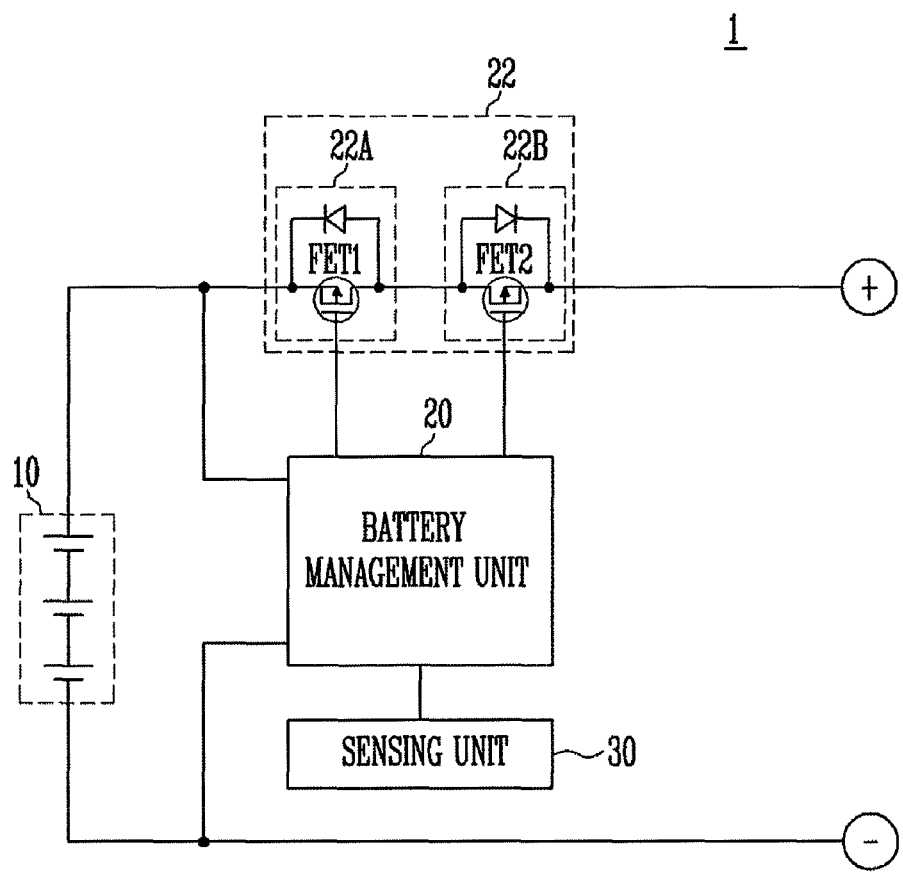
FIG. 2 illustrates an embodiment of the battery pack.

FIG. 2 illustrates an embodiment of a battery pack 1 which includes a plurality of battery units 10, a charge and discharge control switch 22, a battery management unit 20, and a sensing unit 30. The rechargeable battery units 10 may be accommodated in a housing of the battery pack 1 and may be serially connected or connected in parallel by a connection member that connects electrode terminals of the battery units 10.

The battery units 10 may be secondary batteries to be charged or discharged in accordance with consumption or supply of electric energy. For example, the secondary batteries may include a nickel-cadmium battery, a lead storage battery, a nickel metal hydride (NiMH) battery, a lithium battery, a lithium polymer battery, and/or another type of battery.

The sensing unit 30 is provided in the battery pack 1 and obtains motion information of the battery units 10. For example, the sensing unit 30 may obtain motion information of the battery units 10 and output the obtained motion information as an electrical signal. The motion information obtained by the sensing unit 30 may include at least one of i) information obtained by sensing whether the battery units 10 are in a movement state or in a standstill state or ii) information on a state in which the battery units 10 are inclined (which may be obtained, for example, by sensing a change in angle) when the battery units 10 are in the movement state. For example, the sensing unit 30 may output an electrical signal that represents whether the battery units 10 are in the movement state or in the standstill state, or an electrical signal indicative of a slope of the battery units 10.

The sensing unit 30 may be, for example, a gyro sensor that detects acceleration to obtain the motion information, an acceleration sensor that measures acceleration of a moving object or intensity of shock to obtain the motion information, or a motion sensor that performs the functions of the gyro sensor and the acceleration sensor.

In another embodiment, the battery units 10 are fixedly accommodated in the housing of the battery pack 1. Thus, movement of the battery units 10 may be considered as movement of the battery pack 1 and/or movement of the electro-mechanical apparatus including the battery pack 1. For example, the sensing unit 30, which is provided in the battery pack 1, may obtain motion information of the battery pack 1 and motion information of the electro-mechanical apparatus in which the battery pack 1 is provided.

The battery management unit 20 controls charge and discharge operations of the battery units 10 using the charge and discharge control switch 22. For example, the battery management unit 20 may output an operation signal for controlling on/off of a charge control switch 22B during a charge operation or may output an operation signal for controlling on/off of a discharge control switch 22A during a discharge operation.

In addition, the battery management unit 20 may monitor charge states or discharge states of the battery units 10, temperature, and/or a current flow state in the battery pack 1. The battery pack 1 may further include measuring terminals to allow the battery management unit 20 to measure an intermediate voltage and the temperature and to monitor the charge states or the discharge states and the current flow.

The battery management unit 20 may turn off the charge control switch 22B to protect the battery unit 10 when something is wrong with (e.g., an error condition, malfunction, or other predetermined event or mode) the battery pack 1 during the charge operation. The battery management unit 20 may turn off the discharge control switch 22A to protect the battery unit 10 when something is wrong with the battery pack 1 during the discharge operation. The battery management unit 20 may control the charge and discharge switch 22 with reference to protection level data, e.g., which may be a standard by which protection operation for the battery units 10 is driven.

The protection level data may include, for example, data on an over-charge reference voltage, an over-charge reference current, an over-discharge reference voltage, and/or an over-discharge reference current. The protection level data may be set to be differently applied with reference to at least one of i) information on whether the battery units 10 are charged or discharged, ii) information that represents whether the plurality of battery units 10 are in the movement state or in the standstill state, or iii) information indicative of the degree to which the battery units 10 are inclined.

For example, since the battery management unit 20 controls charge or discharge of the battery units 10 with reference to protection level data that is differently applied in based on movements of the battery units 10, different charge modes or discharge modes may be applied in accordance with the movements of the battery units 10.

In one embodiment, the battery pack 1 may include a read only memory (ROM), an electrically erasable programmable ROM (EEPROM), and/or a flash memory to store the protection level data and an equivalent memory device.

Figure 3:
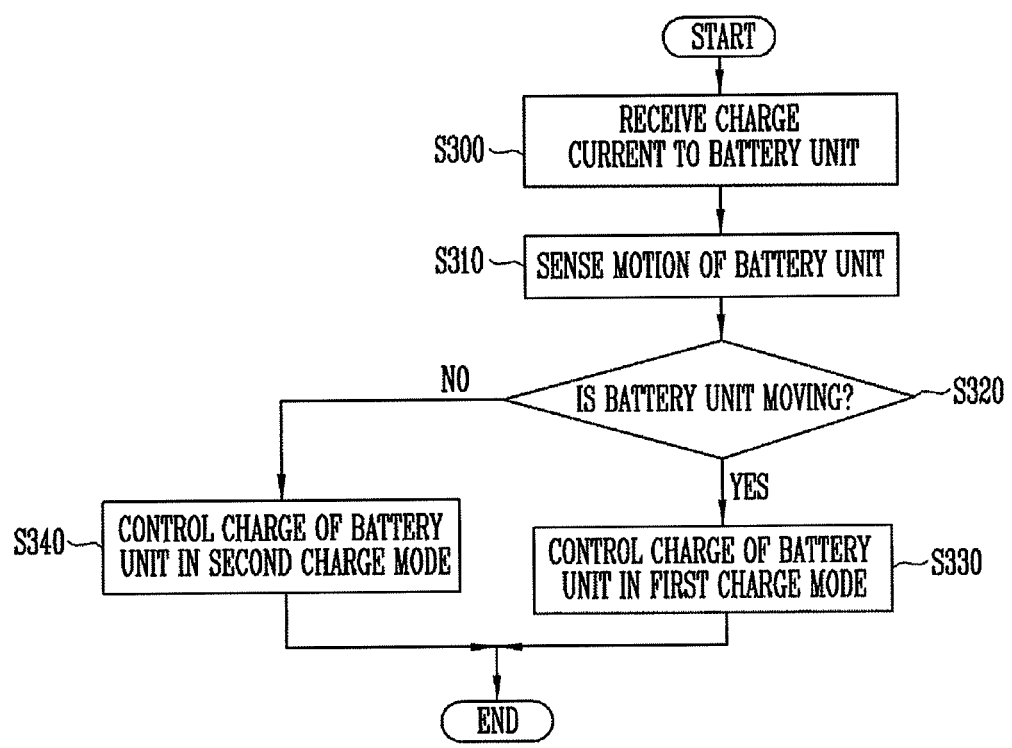
FIG. 3 illustrates an embodiment of a method for controlling a charging operation of a battery pack.
Figure 4:
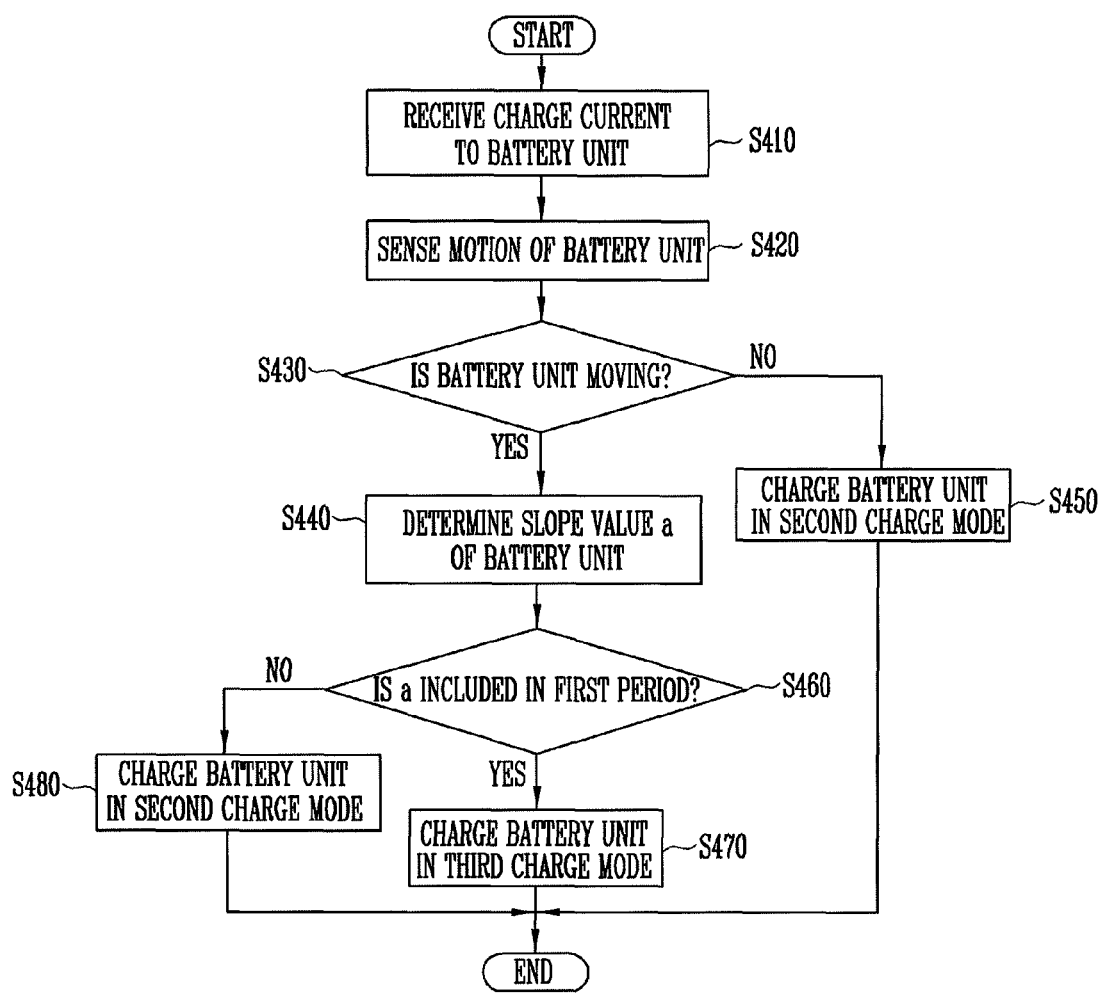
FIG. 4 illustrates another embodiment of a method for controlling a charging operation of a battery pack.

FIGS. 3 to 5 illustrate an embodiment of a method for controlling charge/discharge of the battery pack 1. The battery pack 1 may include an external input terminal for supplying a power source of the battery units 10 to an external load (for example, motor), receiving power from the external power source, and/or receiving regenerated energy from the motor.

FIG. 3 illustrates an embodiment of a method for controlling charging of the battery pack. As illustrated in FIG. 3, the method includes the battery management unit 20 monitoring the current flow state in the battery pack 1 to sense whether charge current is being received by the battery pack 1 (S300), and to receive a signal with respect to the motion information of the battery units 10 output from the sensing unit 30 (S310).

When charge current is being received by the battery pack 1 and the motion information of the battery units 10 from the battery management unit 20 indicates that the battery units 10 are in the movement state (S320), the method includes controlling charging of the battery units 10 in a first charge mode (S330).

When the motion information of the battery units 10 from the battery management unit 20 indicates that the battery units 10 are in the standstill state in operation S320, the method includes controlling charging of the battery units 10 in a second charge mode (S340).

When the battery pack is charged based on power from an external power source, the charge current is received (e.g., constant current charge) in a state in which a charge current value is uniform or the charge current is received (e.g., constant voltage charge) in a state in which a current value is controlled so that a charge voltage value is uniform. When the regenerated energy is received to charge the battery pack, the charge current value or the charge voltage value is randomly received and a larger current value may be received which is larger than a current value for charging the battery pack based on power from the external power source.

In such a case, when a charge block for preventing over-charge is controlled by applying the same protection level data as when the battery pack is charged based on the regenerated energy (e.g., the same protection level is used when the battery pack is charged based on power from the external power source and based on the regenerated energy), the value of energy supplied to the battery units 10 may be less than a value of the regenerated energy. Therefore, the regenerated energy may be inefficiently used.

For example, when the battery pack is charged by the regenerated energy, the range of the protection level data set for preventing over-charge may be larger than for protection level data applied when the battery pack is charged by common external power. When the charge current is received by the battery pack 1, a determination may be made as to whether the battery pack 1 is charged by the common external power or the regenerated energy so that suitable protection level data may be applied.

According to the embodiment, when the charge current is received by the battery pack 1 while the battery pack 1 is moving, it is determined that the battery pack 1 is charged by the regenerated energy, so that charging is controlled in a first charge mode, e.g., a charge mode with reference to protection level data set to be applied when the battery pack is charged by the regenerated energy. When the charge current is received by the battery pack 1 when the battery pack 1 is in the standstill state, it is determined that the battery pack 1 is charged by the common external power source, so that charge may be controlled in a second charge mode, e.g., a charge mode with reference to protection level data set to be applied when the battery pack is charged by the external power source.

At this time, as described above, the protection level data (for example, an over-charge reference voltage or an over-charge reference current for preventing over-charge) set in the first charge mode may be set to be larger than the protection level data set in the second charge mode.

According to another embodiment, a charge controlling method that is differently applied in accordance with the movement state of the battery pack, which is obtained from a slope value of the battery pack, will be described.

FIG. 4 illustrates an embodiment of a method for controlling charge of a battery pack. As illustrated in FIG. 4, first, the battery management unit 20 monitors the current flow state in the battery pack 1 to sense whether the charge current is received by the battery pack 1 (S410), and may receive the signal with respect to the motion information of the battery units 10 output from the sensing unit 30 (S420).

When the charge current is received by the battery pack 1 and the motion information of the battery units 10 obtained by the battery management unit 20 indicates that the battery units 10 are in the standstill state (S430), charge of the battery units 10 may be controlled in the second charge mode (S450). For example, as described above, when the charge current is received when the battery pack 1 is in the standstill state, it is determined that the battery pack 1 is charged by the external power source and charge of the battery units 10 may be suitably controlled in first charge mode.

When the motion information of the battery units 10 obtained by the battery management unit 20 indicates that the battery units 10 are in the movement state (S430), different charge modes may be applied in accordance with whether a slope value a (e.g., a degree to which the battery units 10 are inclined) is included in a predetermined period.

For example, when the slope value a of the battery units 10 is included in a first period, charging of the battery units 10 is controlled in a third charge mode (S470). When slope value a is not in the first period, charging of the battery units 10 may be controlled in the second charge mode (S480).

In an electro-mechanical apparatus that regenerates energy, when the speed is reduced by operating a brake in a state in which the electro-mechanical apparatus is travelling, inertial force is generated by the electro-mechanical apparatus so that the electro-mechanical apparatus tries to continuously travel. At this time, the motor is driven in reverse by the inertia force, so that the motor operates as a generator and performs regenerative braking to generate electricity to charge the battery pack.

In charging the battery pack by the regenerated energy, when the battery pack 1 is charged by regenerated energy generated by operating a brake when the electro-mechanical apparatus travels on a flatland, and when the battery pack 1 is charged by the regenerated energy generated when the electro-mechanical apparatus travels on a downhill road, an average charge current value and a maximum charge current value that are received to the battery pack 1 may be different. Therefore, the range of protection level data for preventing over-charge when the battery pack 1 is charged by the regenerated energy generated when the electro-mechanical apparatus travels the flatland may be set to be different from that of protection level data for preventing over-charge when the battery pack 1 is charged by the regenerated energy generated when the electro-mechanical apparatus travels on the downhill road According to one embodiment, as described above, when the charge current is received by the battery pack 1 when the battery pack 1 is moving, it is determined that the battery pack 1 is charged by the regenerated energy. When the degree to which the battery pack 1 is inclined deviates from the first period (e.g., when the battery pack 1 is charged by the regenerated energy generated by operating the brake in the electro-mechanical apparatus that is travelling on the flatland), charging of the battery pack 1 is controlled in the first charge mode. Unlike the above, when the slope value a of the battery pack 1 is included in the first period (e.g., when surplus torque is generated by the electro-mechanical apparatus that is travelling on the downhill road so that the regenerated energy is generated), charging of the battery pack 1 may be controlled in the third charge mode.

According to one embodiment, when the charge current is received by the battery pack 1, the movement state of the battery pack 1 is determined by the sensing unit 30 in the battery pack 1, so that a method by which the battery pack 1 is charged may be easily determined. Further, charging the battery pack 1 may be controlled by applying a charge mode suitable for the charge method.

For example, when the charge current is received by the battery pack 1 and the battery pack 1 is in the standstill state, it is determined that the battery pack 1 is charged by the external power source, so that charging the battery pack 1 is controlled (in the second charge mode) with reference to protection level data set to be suitable.

When the charge current is received by the battery pack 1 and the electro-mechanical apparatus is in the movement state in which the slope value a is not included in the first period, it is determined that the battery pack 1 is charged by regenerated energy generated by operating the brake in the electro-mechanical apparatus that is travelling on the flatland, so that charging the battery pack 1 may be controlled (the first charge mode) with reference to protection level data set to be suitable.

Finally, when the charge current is received by the battery pack 1 and the slope value a of the battery pack 1 is in the movement state in which the slope value a is included in the first period, it is determined that the battery pack 1 is charged by the regenerated energy (generated by generating surplus torque generated by the electro-mechanical apparatus travelling on a downhill road) so that charging the battery pack 1 may be controlled (the third charge mode) with reference to protection level data set to be suitable.

Therefore, the battery pack according to one or more embodiments performs an over-charge protecting operation for reducing heat generation of the battery pack, which may improve stability of the battery pack and efficient use the regenerated energy.

According to another embodiment, a discharge controlling method is described that is differently applied in accordance with the movement state of the battery pack 1, obtained from the slope value of the battery pack 1 when the battery pack 1 is moving while the battery pack 1 is discharged.

FIG. 5 illustrates an embodiment of a method for controlling discharge of a battery pack. As illustrated in FIG. 5, first, the battery management unit 20 monitors the current flow state in the battery pack 1 to sense whether the battery pack 1 is discharged (S510) and receives the signal with respect to the motion information of the battery units 10 output from the sensing unit 30 (S520).

When a discharge current is received by the battery pack 1 and the battery units 10 are in the movement state, the battery management unit 20 may determine whether the slope value a (that is the degree to which the battery units 10 are inclined) is included in a third period, in operations S530 and S540.

When it is determined that the slope value a is included in the third period, discharging the battery units 10 is controlled in a first discharge mode (S550). When it is determined than the slope value a is not included in the third period, discharging the battery units 10 may be controlled in a second discharge mode (S560).

When the battery units 10 are discharged, in order to prevent over-discharge, protection level data for preventing over-discharge (e.g., an over-discharge reference voltage value and an over-discharge reference current value) are set and a discharge current may be blocked based on the protection level data for preventing over-discharge.

Also, in driving an electro-mechanical apparatus including the battery pack 1, there is a difference in required power between when the electro-mechanical apparatus travels on a flatland and when the electro-mechanical apparatus travels on an uphill road. When the over-discharge preventing protection level data value is set to be high (even though large power for driving the electro-mechanical apparatus is required) so that it is expected that a voltage of the battery pack is remarkably reduced within a short time, the discharge current is easily blocked so that the electro-mechanical apparatus may not be easily driven. Therefore, the over-discharge preventing protection level data value set to be applied to the case in which the slope value of the battery units 10 is included in the third period (e.g., the case in which the electro-mechanical apparatus including the battery pack travels on the uphill road so that large power is required) may be different from the over-discharge preventing protection level data value (when the slope value is not included in the third period and may be smaller than the over-discharge preventing protection level data value applied to a discharge state in which the slope value is not included in the third period).

In setting the protection level data for preventing over-discharge, the protection level data may be set to vary in accordance with the motion information of the battery pack 1, e.g., the movement state of the electro-mechanical apparatus including that battery pack 1. Therefore, it is possible to secure stability of the battery pack 1 and to improve driving efficiency of the apparatus including the battery pack.

In accordance with one or more embodiments, the first, second, and third periods for describing the slope value a of the battery pack may be $P(R,-90°)<$the first period $<P(R,-\theta)$, $P(R, -\theta\leq$the second period$\leq P(R, \theta)$, $P(R, \theta)<$the third period$<P(R, 90°)$ based on a polar coordinate system. The value of $\theta$ may be changed within a range in which the electro-mechanical apparatus including the battery pack is positioned on the flatland. For example, the first period may represent that the electro-mechanical apparatus including the battery pack is positioned on the downhill road, the second period may represent that the electro-mechanical apparatus including the battery pack is positioned on the flatland, and the third period may represent that the electro-mechanical apparatus including the battery pack is positioned on the uphill road.

In accordance with another embodiment, an apparatus includes an interface and control logic to receive motion information for a plurality of batteries through the interface and to control charging or discharging of the batteries based on the motion the information. The motion information includes at least one of i) first information corresponding to whether the batteries are in a movement state or in a standstill state, or ii) second information indicative of an inclined state of the batteries.

The interface may take various forms. For example, when the control logic is embodied in an integrated circuit chip, the interface may be one or more output terminals, leads, wires, ports, signal lines, or other type of interface of the chip within or coupled to the driver. Some of the signals lines are illustratively shown in FIG. 2, for example. The control logic may correspond to or preform functions of the battery management unit 20 explained with reference to the aforementioned embodiments.

The control logic may include, for example, may include hardware, software, or both. When implemented at least partially in hardware, the control logic may be, for example, any one of a variety of integrated circuits including but not limited to an application-specific integrated circuit, a field-programmable gate array, a combination of logic gates, a system-on-chip, a microprocessor, or other processing or control circuits.

When implemented in at least partially in software, the control logic may include, for example, a memory or other storage device for storing code or instructions to be executed, for example, by a computer, processor, microprocessor, controller, or other signal processing device. The computer, processor, microprocessor, controller, or other signal processing device may be those described herein or one in addition to the elements described herein. Because the algorithms that form the basis of the methods (or operations of the computer, processor, microprocessor, controller, or other signal processing device) are described in detail, the code or instructions for implementing the operations of the method embodiments may transform the computer, processor, controller, or other signal processing device into a special-purpose processor for performing the methods described herein.

The control logic controls charging of the batteries based on first protection level data and is to control discharging of the batteries based on second protection level data, the first protection level data different from the second protection level data. Each of the first and second protection level data includes data indicative of at least one of an over-charge reference current, an over-charge reference voltage, an over-discharge reference current, or an over-discharge reference voltage. Charge current is received by the batteries when the batteries are in the movement state. The control logic may control charging of the batteries when a slope value of the batteries is in a predetermined range.

As indicated, the control logic may be controlled based on instructions stored in a storage area, e.g., a memory. In this case, interface may correspond, for example, to any of the aforementioned types or may correspond to first code to input the motion information to second code of the control logic.

Another embodiment may include a computer-readable medium, e.g., a non-transitory computer-readable medium, for storing the code or instructions for performing operations of the battery management system or control logic of the aforementioned embodiments. The computer-readable medium may be a volatile or non-volatile memory or other storage device, which may be removably or fixedly coupled to the computer, processor, controller, or other signal processing device which is to execute the code or instructions for performing the method embodiments described herein.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A battery pack, comprising:
   a plurality of rechargeable batteries;
   a sensor to obtain motion information of the rechargeable batteries, the motion information including at least one of i) first information obtained by sensing whether the rechargeable batteries are in a movement state or in a standstill state or ii) second information on a state in which the rechargeable batteries are inclined, the second information to be obtained based on a change in angle when the rechargeable batteries are in the movement state; and
   a battery manager to receive the motion information of the rechargeable batteries from the sensor and to control charging of the rechargeable batteries in different charge modes based on the motion information or to control discharging of the rechargeable batteries in different discharge modes based on the motion information.

2. The battery pack as claimed in claim 1, wherein:
   the battery manager is to control charging or discharging of the rechargeable batteries based on protection level data for protecting the rechargeable batteries, the battery manager to apply different protection level data in the charge mode and the discharge mode based on the motion information.

3. The battery pack as claimed in claim 2, wherein the protection level data includes data indicative of at least one of an over-charge reference current, an over-charge reference voltage, an over-discharge reference current, or an over-discharge reference voltage.

4. The battery pack as claimed in claim 2, wherein:
when the rechargeable batteries are in the movement state and when charge current is received by the rechargeable batteries, the battery manager is to control charging of the rechargeable the batteries in a first charge mode.

5. The battery pack as claimed in claim 4, wherein:
when the rechargeable batteries are in a standstill state and when charge current is received by the rechargeable batteries, the battery manager is to control charging of rechargeable batteries in a second charge mode.

6. The battery pack as claimed in claim 5, wherein:
the protection level data in the first charge mode and the second charge mode include data corresponding to at least one of the over-charge reference voltage or the over-charge reference current, and the over-charge reference voltage or current value in the first charge mode is larger than the over-charge reference voltage or current value in the second charge mode.

7. The battery pack as claimed in claim 4, wherein:
charge current is received by the rechargeable batteries when the rechargeable batteries are in a movement state, and
when a slope value of the rechargeable batteries is in a first period, the battery manager is to control charging of the rechargeable batteries in a third charge mode.

8. The battery pack as claimed in claim 1, wherein:
when the rechargeable batteries are in a movement state and when the rechargeable batteries are discharged, the battery manager is to control discharging of the rechargeable batteries based on protection level data that is differently set based on a period in which a slope value of the rechargeable batteries is included.

9. The battery pack as claimed in claim 8, wherein the protection level data includes data corresponding to at least one of an over-discharge reference current or an over-discharge reference voltage.

* * * * *